United States Patent [19]

Kaun et al.

[11] Patent Number: 4,687,717

[45] Date of Patent: Aug. 18, 1987

[54] BIPOLAR BATTERY WITH ARRAY OF SEALED CELLS

[75] Inventors: Thomas D. Kaun, New Lenox; John A. Smaga, Lemont, both of Ill.

[73] Assignee: The United States of America as represent by the United States Department of Energy, Washington, D.C.

[21] Appl. No.: 883,216

[22] Filed: Jul. 8, 1986

[51] Int. Cl.$^4$ ............................................. H01M 6/48
[52] U.S. Cl. .................................... 429/152; 429/247; 429/210; 429/155
[58] Field of Search ............... 429/152, 153, 154, 155, 429/210, 112, 156, 157, 158, 247

[56] References Cited

U.S. PATENT DOCUMENTS

| | | | |
|---|---|---|---|
| 3,003,012 | 10/1961 | Duddy | 429/153 |
| 4,070,528 | 1/1978 | Bergum et al. | 429/152 |
| 4,169,920 | 10/1979 | Epstein | 429/154 |
| 4,177,330 | 12/1979 | Gordon et al. | 429/152 |
| 4,189,529 | 2/1980 | Birt et al. | 429/103 |
| 4,208,473 | 6/1980 | Bradley | 429/112 |

Primary Examiner—Brian E. Hearn
Assistant Examiner—Steven P. Marquis
Attorney, Agent, or Firm—William Lohff; Hugh W. Glenn; Judson R. Hightower

[57] ABSTRACT

A lithium alloy/metal sulfide battery as a dipolar battery is disclosed with an array of stacked cells with the anode and cathode electrode materials in each cell sealed in a confining structure and separated from one another except across separator material interposed therebetween. The separator material is contained in a module having separate perforated metallic sheets that sandwich opposite sides of the separator material for the cell and an annular insulating spacer that surrounds the separator material beyond the perforations and is also sandwiched between and sealed to the sheets. The peripheral edges of the sheets project outwardly beyond the spacer, traverse the side edges of the adjacent electrode material to form cup-like electrode holders, and are fused to the adjacent current collector or end face members of the array. Electrolyte is infused into the electrolyte cavity through the perforations of one of the metallic sheets with the perforations also functioning to allow ionic conductance across the separator material between the adjacent electrodes. A gas-tight housing provides an enclosure of the array.

9 Claims, 7 Drawing Figures

BIPOLAR BATTERY WITH ARRAY OF SEALED CELLS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Lithium alloy/iron sulfide bipolar batteries, currently under development, have positive and negative electrode materials confined relative to structural positive and negative current collectors, which are electrically insulated from one another by separators. Typically, the negative electrode material is a lithium alloy (generally LiAl or LiSi), the positive electrode material is an iron sulfide ($FeS$ or $FeS_2$), and the separators are formed of a fibrous boron nitride (BN) or a pressed powder magnesium oxide (MgO) or aluminum nitride (AlN). An electrolyte such as a lithium chloride, lithium bromide and potassium bromide mixture (LiCl-LiBr-KBr), is present in the electrode materials and the separators. The positive and negative current collectors are commonly formed of electrically conductive sheets that also confine the electrode materials.

Full size batteries of this type are comprised of many cells grouped together in an end-to-end or face-to-face arrangement in a common battery housing and electrically connected in series to produce higher effective voltage output. A thin cell version is capable of very high current density. The battery is designed to operate at temperatures in the range of 375°–500° C. The electrode materials and electrolyte are most corrosive at these temperatures so that the current collectors must be of corrosive resistant yet electrically conductive material. Moreover, the battery is intended to have an operating life in excess of 1000 "deep discharge" cycles, where each "deep discharge" cycle means discharging the fully charged battery down to approximately only a 5% charge level before recharging it again. During this deep discharge cycling, the positive and negative electrode materials undergo volumetric changes at different rates. This can shift the electrode materials relative to one another within the battery cell or can even deform the separators.

Another major problem in existing bipolar battery designs and particularly those involving electrolytes normally fluid at cell operating temperatures (i.e., 375°–500° C.) has been electrolyte leakage past the wetted separator between adjacent positive and negative electrodes. The electrolyte is consumed by electrolytic decomposition and could produce metallic deposits sufficient to cause battery failure by shorting out the adjacent collectors or to the external battery housing. Compression of the stacked and sandwiched plate-like cell components within the battery case confinement is used now as the primary means in many bipolar batteries to maintain the separator sealed at its edge. Past approaches to hermetic sealing of the bipolar battery have not been effective. The cells were stacked first and then seal fabrication was attempted. Usually the cells contain electrolyte prior to the formation of seals adjacent the electrolyte. Since the sealing often occurs at elevated temperatures, electrolyte leakage limits the effectiveness of the seals. Seal fabrication conditions are also severely restricted due to the presence of electrode materials and electrolyte.

Accordingly, one object of this invention is to provide a design for a bipolar battery that seals the positive and negative electrode materials within a leak-proof current-collecting containment separated from another except across a separator module interposed therebetween.

A second object of the invention is to provide a cell enclosure design in which any seals adjacent the electrolyte cavity or chamber are formed prior to the addition of electrolyte.

A more detailed object of this invention is to provide for the stacked arrangement of many of such cells and further to mechanically and electrically connect them together, as part of the same containment design, with the positive and negative current collecting containments of adjacent cells sharing a common or bipolar current collector to provide also a series electrical connection of the cells.

A specific object of this invention is to provide an improved seal arrangement at the edge of each cell particularly in a high power lithium metal/iron sulfide battery.

Another object of this invention is to provide a seal arrangement for the anode and cathode electrodes by utilizing peripherial edges of the containment sheets of the separator module that project radially beyond the annular spacer and that can be folded over the edges of the corresponding anode and cathode electrode material and sealed to a current collector sandwiching the opposite side of the respective electrode material.

An additional object of this invention is to provide a method of forming the separator module without electrolyte or electrode materials present.

SUMMARY OF THE INVENTION

Briefly, this invention is directed to an enclosure for individual electrochemical cells of a bipolar battery and particularly a lithium metal/iron sulfide battery wherein a plurality of cells are placed in an end-to-end or face-to-face arrangement or array. The enclosure comprises a pair of spaced-apart perforated metal sheets with an outer insulating member between and sealed to the sheets to enclose the perforations within a perimeter and form an electrolyte cavity. Preferably, an electrolyte separator is in the cavity prior to the formation of the sealed insulating member which may be a glass bead or separate spacer sealed to the sheets, depending on the thickness of the cavity.

Preferably, the sheets have lateral extensions protruding beyond the insulating member and bent to form cup-like electrode holders with opposite open ends to receive electrodes. The individual cell enclosures are completed by sealing a metal current collector or end face cup to the open ends. Prior to this step, electrolyte is added to the cavity by adding electrolyte to within one electrode holder to flow into the cavity under normal conditions or to be made fluid at elevated temperatures and flow into the cavity.

The resultant bipolar battery includes the array of cells and cell enclosures with individual current collectors sealed to adjacent open ended electrode holders of adjacent cells and with electrically opposite electrode ends. In the array, the collective cell enclosures are considered as a means for isolating each cell and the plurality of cells forming the bipolar battery. In addition to collective cell enclosures, the bipolar battery of the invention includes a housing enclosing the array of cells and cell enclosures with means for external electrical connection to the electrically opposite ends of the array.

DETAILED DESCRIPTION OF THE PREFERRED EMBODIMENT

As described herein, the bipolar battery of the invention comprises a plurality of individual cells with electrode faces in a face-to-face stacked array with electrically opposite electrode ends and electrically conductive end face caps in contact with said electrode ends of the array, each cell including a pair of electrically opposite electrodes in contact with and separated by a central separator containing an electrolyte normally fluid during operation of the battery, the array including a current collector sheet between and in electrical contact with adjacent electrodes of adjacent cells, means for isolating each cell from adjacent cells including a pair of cup-like metallic electrode holders with perforated and facing closed ends in a spaced apart arrangement to enclose the electrodes of said cell with the perforations of each holder permitting an electrode-electrolyte interface for ionic transport, each holder having side walls forming an open end attached in a sealing engagement with an adjacent current collector sheet or end face cap, and an insulating member between and in sealing engagement with the adjacent perforated closed ends to enclose the electrolyte and perforations, and a housing enclosing the array with means for external electrical connection to the electrically opposite ends of the array.

Figure 2:
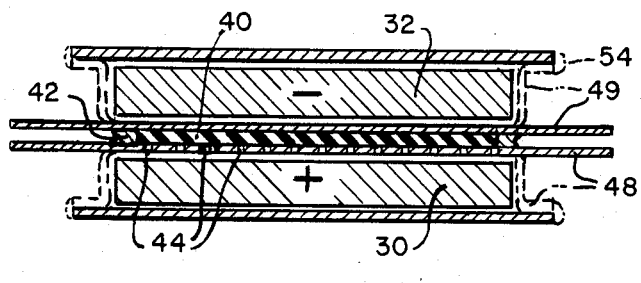
FIG. 2 is a view similar to FIG. 1, except showing one working cell of the particular battery in prefinished condition, and also in phantom in finished condition.
Figure 1:
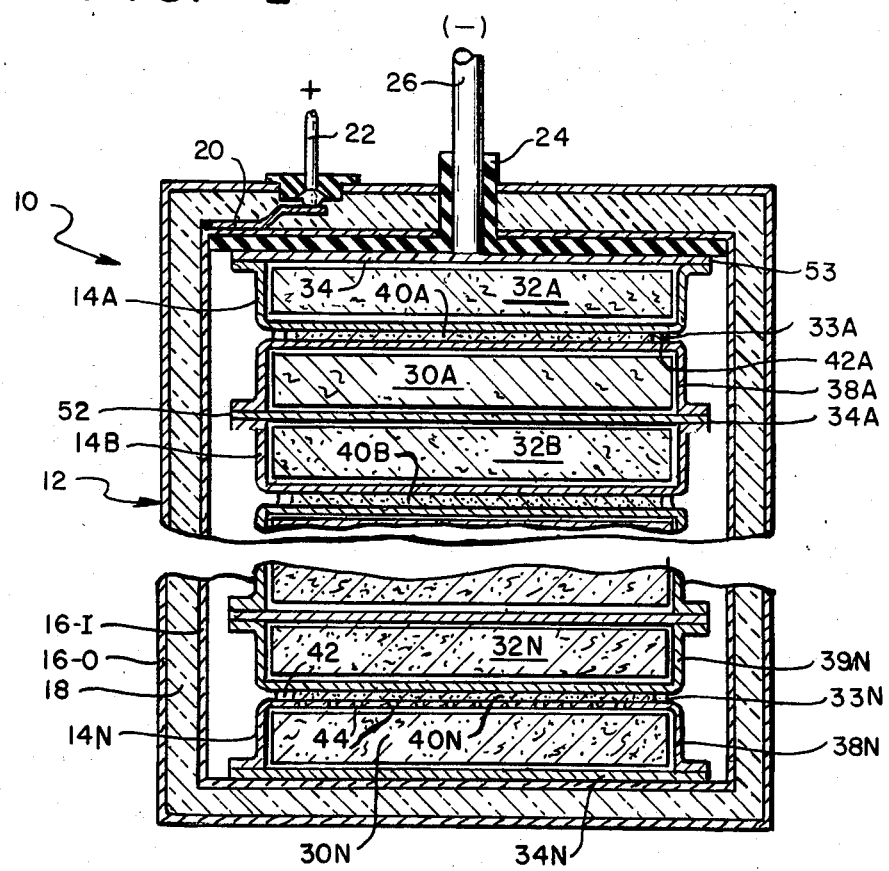
FIG. 1 is an elevational sectional view of a lithium aluminum/metal sulfide battery for which the subject invention forms an improvement.
Figure 3:
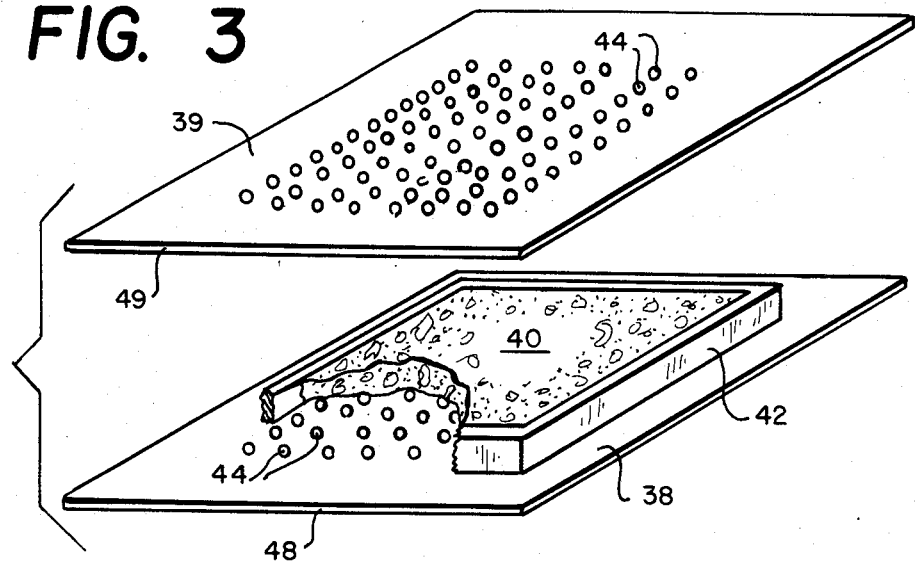
FIG. 3 is an exploded perspective view of several of the main components used to form a separator module used in the subject invention.

As seen in FIG. 1, the disclosed high power lithium alloy/iron sulfide battery 10 illustrative of bipolar batteries has a housing 12 and individual cells 14A, 14B, 14N, etc., located within the housing 12 in a stacked positive (+) to negative (−) serially arranged fashion. The housing 12 is formed of inner and outer walls, 16-I and 16-O, respectively, which are separated from one another by thermal insulation 18. The battery illustrated is positive grounded, so that the serially connected cells provide that the base cell 14N is connected via its anode current collector (as an end face cap), the interior housing wall 16-I and appropriate conductor 20 from the interior housing connects to exposed positive terminal 22; while the top cell 14A is connected via its cathode current collector (as an end face cap) and an electrically insulating feedthrough seal 24 to the negative terminal 26. As such, the voltage across the positive and negative terminals 22 and 26, respectively, would be the cumulative voltage of the cells 14A-N etc. in the housing 12.

Each cell 14A, 14B, 14N, etc., used in the formation of the battery 10 of FIG. 1. has an anode 30A, 30B, 30N and a cathode 32A, 32B, 32N, etc. separated from one another across a separator module 33A, 33B, 33N, etc.; and current conductors (34, 34A, 34B, 34N) sandwich the outer sides of the anodes 30 and cathode 32. The separator module 33 includes a pair of spaced apart electrically conductive sheets (38A, 38B, 38N and 39A, 39B, 39N) immediately adjacent the specific anode or cathode electrode; and a central mass 40A, 40B, 40N, etc. of separator material and an insulating member illustrated as an insulating bead or spacer element 42A, 42B, 42N, etc. annularly of or surrounding the separator material 40 and sandwiched between the spaced sheets (38 and 39). As insulating beads or spacers, various insulating materials, preferably with high temperature properties, may be used. Suitably, the insulating member is alumina with aluminized sheets, glass with aluminized or iron-based sheets, nickel-phosphorous with these and other materials. Further, the sheets (38 and 39), particularly in the region confined within the spacer element 42 are perforated with many small openings 44, of the order of between 0.1 and 2 millimeters to yield 35-65% openness within a perimeter.

The end edges (48-49) of each module sheet (38 and 39) thus overwraps the side edges of the electrodes (30 and 32) beyond the perimeter about the perforations and are welded, pressure fused or otherwise permanently bonded at joints 52 and 53 to the current collectors 34 to enclose and seal the respective electrodes. As such, each electrode (30 and 32) is sealed from the exterior on the one face by the impervious current collector 34 and on the edges by the impervious peripheral edges of the separator module sheets (38 and 39); and the perforated sheet part of the separator module closes the opposite face of the electrode.

In an assembled condition, many cells 14A, 14B, 14N, etc. will be stacked on one another and sealed from the exterior. The adjacent cells will have common current collectors between the cathode and anode materials of different adjacent cells. See collector 34A between anode 30A of cell 14A and cathode 32B of cell 14B, for example. The stack of such cells, as noted above, is normally confined in a gas-tight pressure confining housing 12.

The individual cell assembly provided by the invention is particularly advantageous for cells with thin electrodes and electrolyte separators made by tape casting. These cells may be characterized by diameters in the range of 50-500 times the thickness of the cell including electrodes and separator.

Prior to the assembly operation, electrolyte has been infused into the electrodes and the separator material by any of several known techniques; one being addition by melting electrolyte particles into the enclosure holding the electrode which are positioned into the separator module. The electrolyte thereupon can pass by ionic conductance across the separator material 40 between or relative to the anode and cathode electrode materials 30 and 32; and via the perforations 44 in the separator module sheets, to migrate between the anode and cathode electrode materials. However, the electrode materials are otherwise confined or sealed from the exterior as noted above. In addition to the sealed joints, the stack of cells is maintained compressed by means of its abutment against the opposite walls of the housing itself. A layer 24 of insulating material is interposed between the cathode current collector 34 of cell 14A and the inner wall 16-I of the housing.

Figure 4A:
FIGS. 4a, 4b, 4c and 4d are elevational sectional views, showing the sequential steps of formation of several embodiments of the separator module disclosed herein.
Figure 4B:
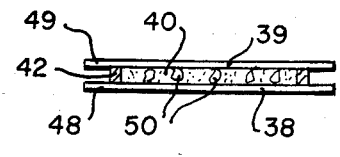
Figure 4C:
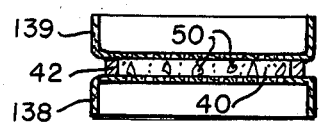
Figure 4D:
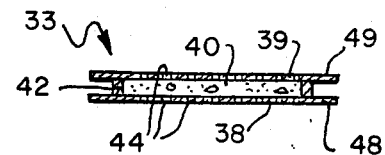

Several embodiments of the separator module are shown in various stages of fabrication in FIGS. 4A through 4D. The initial step would provide that the sheets 38 and 39 would be stacked on opposite sides of and sandwich the spacer 42, the edges 48 and 49 of the sheets projecting outwardly beyond the spacer 42. This is illustrated in FIGS. 1 and 4A. It is possible and probably desirable to place in the confinement within the spacer 42 a plurality of solid particles or fibers 50 or a sintered porous ceramic body sized approximately the same as the thickness of the spacer to serve as local supports tending to prevent the sheets 38 and 39 from drooping in the middle and contacting one another. A sheet of tape-cast separator (or sintered body) 40 is then positioned within the spacer 42. This is illustrated in FIG. 4B. It may be preferred to use a preformed cup-shaped sheet 138 and 139, as illustrated in FIG. 4C; where in fact the preforming and the perforating for openings 44 might be done simultaneously in the same forming machine (not shown). As thus far assembled, the components might be thermally heated and/or pressure fused together in this configuration. Thus, the components might be cured under pressure constraints at an elevated temperature for a short duration, such as under 20-100 psi up to 1400° C. for 5-30 minutes for the solder glass, whereupon the spacer 42 fuses or becomes bonded to the separator sheets 38 and 39 to form a unitized assembly. Again, it may be preferred to utilize a Al/Al$_2$O$_3$ diffusion bond, solder glass, braze or the like to fuse or bond the components together.

Alternatively, after cooling this unitized assembly, as illustrated in FIG. 4A, to a workable temperature less than 200°-300° C., the separator material 40 in the form of a slurry at 200° C. or less would be doctored through the perforations 44 in the separator sheets 38 and 39 to fill the space between the sheets and within the spacer not occupied by any solid particles or fiber 50 (shown in cross section) of separator. This subassembly would then be heat cured for a short duration, such as at 400°-500° C. for 10-120 minutes. After curing, this unitized separator module 33 can be cooled to less than 200° C., and would have the sheets permanently separated from one another but yet connected mechanically across the solidified separator material 40 contained within the spaced sheets 38 and 39 and the annular spacer 42.

Thereafter to further form the individual cell or stacked cells of the battery, the separator module 33 would be positioned between the electrode materials, with the anode 30 being positioned adjacent one sheet and the cathode 32 being positioned adjacent the opposite sheet. In this regard, the electrode materials typically are formed as a plaque 10-50 centimeters in cross dimension and 0.1-5 millimeters in thickness. Further, the current collectors 34 are sandwiched on opposite sides of the electrode materials, specifically one being located adjacent the cathode and one being located adjacent the anode. The peripheral edges 48 and 49 of the flat separator module sheets 38 and 39 are then formed over the side edges of the electrode materials to lap as shown against (or possibly only to butt against) the adjacent current collector 34; whereas the preformed cups would already lap the adjacent edges of the electrode. The separate sheets 38 and 39 of the separator module are specifically formed or bent in opposite directions, one (39) being upwardly around the cathode 32 and the other (38) being downwardly around the anode 30. These lapped (or butted) joints 54 are then welded, pressure fused and or chemically bonded to define a single cell of the battery.

As the sheets 38 and 39 of the separator module 33 are only of several mils thickness (1-5 mils), they can be readily welded or fused by welding in vacuum (electron beam or laser welding) across continuous joints to the current collector 34 to seal the electrode material therebywithin. The same can be done in a fixture (not shown) for improved speed or consistency of fabrication. Electrowelding may be apropriate for thicker cells, ≧2 mm, having current collector materials of 5-15 mils thickness.

Under normal circumstances, this same process can be repeated sequentially with many cells, can be done simultaneously on many cells, or can be done with a combination of these by first forming groups or ministacks of cells and then securing the groups or ministacks of cells together. In any technique, the anode of one cell is located opposite the same current collector of the cathode another cell, as illustrated in FIG. 1 with respect to cells 14A and 14B, to establish a bipole current collector between each pair of adjacent cells of the stack.

Accordingly, the invention relates to a method of assembling a bipolar battery formed by a plurality of individual cells in a stacked array, comprising the steps of forming a plurality of cell enclosure assemblies, each comprising an electrolyte separator sheet, a pair of perforated metal sheets on opposite sides of the separator sheet, the perforations being within a predetermined perimeter, and an insulating member between and sealed to the metallic sheets and about said perimeter to enclose said separator sheet and said perimeter, providing electrolyte to fill each electrolyte cavity, inserting the electrically opposite electrodes on the perforated metal sheets on sides opposite the separator sheet, assembling the cells and cell enclosures in an array with a current collector sheet between adjacent cells and an end face cap at each opposite end of the array, the assembling step including sealing each metal sheet to an adjacent current collector sheet or end face cap to enclose the adjacent electrode, and enclosing the array with an external housing to enclose the array and provide electrical connection to the electrically opposite ends of the array.

The separator module 33 would mechanically connect but maintain the adjacent electrically conductive module sheets 38 and 39 for the anode and cathode electrode materials separated from one another, and also would seal against the exterior leakage of the electrolyte from the electrode materials. Of great importance, therefore, is the fact that adjacent cells will be sealed from one another so that electrolyte leakage will be eliminated. Moreover, the regular sequence of fabrication of the separator module can lead to improved quality control, not only insofar as mechanically stacking the components and fusing or welding them together, but also and with respect to the quantity of material used.

In an embodiment of the battery, the separator would initially be in the form of powdered MgO, or other chemically stable ceramics (AlN, BN, MgO, Si$_3$N$_4$) the spacer would be of solid formed solder glass or alumina (Al$_2$O$_3$) or other chemically stable ceramic (as listed), perhaps 0.05-2 millimeters thick, while the separator module sheets would be formed of aluminized steel or molybdenum of 1-15 mils thick. Moreover, the edges of the separator module sheets would project beyond the spacer at least by the thickness of the electrode structures themselves, plus the overlap distance of the sealed lap joint. The cathode or positive electrode 30 initially would be formed FeS or $FeS_2$ with electrolyte infusion; while the negative electrode or anode 32 initially would be formed lithium aluminum (LiAl) or other lithium alloy, with electrolyte infusion. The electrolyte would be a fused mixture containing lithium and potassium halide salts. Powders, sheets or coatings of glass solder (borate glass), nickel braze (approximately 88% Ni, 12% P), or the like, can be used along with the separator powders to promote sintering onto the module spacers and onto the perforated faces of the separator module sheets between the electrodes. Moreover, adhesive bonding might also be appropriate.

The subject invention thus would provide the reliability for the lithium alloy/metal sulfide bipolar battery cell, particularly against the leakage of the electrolyte from the assembly, to minimize electrolyte consumption and the development of electrical shorts across the adjacent current collectors. In addition, the invention would enhance dimensional stability of the electrode stack and allow the fabrication of thin (capacitor-like) cells.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of this invention in which an exclusive property or privilege is claimed are defined as follows:

1. A bipolar battery comprising a plurality of individual cells with electrode faces in a face-to-face stacked array with electrically opposite electrode ends and electrically conductive end face caps in contact with said electrode ends of the array, each cell including a pair of electrically opposite electrodes in contact with and separated by a central separator containing an electrolyte normally fluid during operation of the battery, the array including a current collector sheet between and in electrical contact with adjacent electrodes of adjacent cells, means for isolating each cell from adjacent cells including a pair of cup-like metallic electrode holders with perforated and facing closed ends in a spaced apart arrangement to enclose the electrodes of said cell with the perforations of each holder permitting an electrode-electrolyte interface for ionic transport, each holder having side walls forming an open end attached in a sealing engagement with an adjacent current collector sheet or end face cap, and an insulating member between and in sealing engagement with the adjacent perforated closed ends to enclose the electrolyte and perforations, and a housing enclosing the array with means for external electrical connection to the electrically opposite ends of the array.

2. The bipolar battery of claim 1 wherein the separator contains particles sized to provide spacing between the closed ends of the electrode holders.

3. The bipolar battery of claim 1 wherein the diameter of the cells are in a range of 50-500 times the thickness of the cell.

4. The bipolar battery of claim 1 including an insulating support for retaining the array in a fixed position within the housing.

5. A cell enclosure for an electrochemical device having a pair of electrically opposite electrodes and a separator between and in electrical contact with the electrodes, the enclosure comprising a pair of spaced-apart perforated metal sheets, an electrolyte separator between the metal sheets and an insulating member extending about the electrolyte separator and the perforations and sealed to the sheets.

6. The cell enclosure of claim 5 wherein the sheets have lateral extensions protruding beyond the insulating member and bent to form cup-like electrode holders with opposite open ends to receive electrodes.

7. The cell enclosure of claim 6 including an electrode in each electrode holder and a current collector sheet in a sealing engagement with at least one of said open ends.

8. The cell enclosure of claim 7 wherein an electrode is an iron sulfide, the second electrode is a lithium alloy, and the electrolyte is a mixture of metal halides having a melting temperature in the range of about 300°-500° C.

9. The cell enclosure of claim 7 wherein the insulating member is alumina, glass or a chemically stable ceramic.

* * * * *